(12) United States Patent
Sundberg et al.

(10) Patent No.: US 12,149,146 B2
(45) Date of Patent: Nov. 19, 2024

(54) ELECTRICAL MOTOR WITH AN INTRINSIC COOLING SYSTEM

(71) Applicant: Zparq AB, Stockholm (SE)

(72) Inventors: Mikael Sundberg, Upplands Väsby (SE); Jonas Genchel, Tyresö (SE); Ivan Stenius, Tyresö (SE)

(73) Assignee: ZPARQ AB, Stockholm (SE)

( * ) Notice: Subject to any disclaimer, the term of this patent is extended or adjusted under 35 U.S.C. 154(b) by 184 days.

(21) Appl. No.: 17/640,613

(22) PCT Filed: Sep. 14, 2020

(86) PCT No.: PCT/SE2020/050857
§ 371 (c)(1),
(2) Date: Mar. 4, 2022

(87) PCT Pub. No.: WO2021/049999
PCT Pub. Date: Mar. 18, 2021

(65) Prior Publication Data
US 2022/0345001 A1    Oct. 27, 2022

(30) Foreign Application Priority Data

Sep. 12, 2019   (SE) .................................. 1951033-8

(51) Int. Cl.
*H02K 5/20*     (2006.01)
*H02K 5/132*    (2006.01)

(52) U.S. Cl.
CPC ............. *H02K 5/203* (2021.01); *H02K 5/132* (2013.01)

(58) Field of Classification Search
CPC .......... H02K 5/132; H02K 5/20; H02K 5/203; H02K 9/00
See application file for complete search history.

(56) References Cited

U.S. PATENT DOCUMENTS

| 4,468,611 A | 8/1984 | Tward |
| 5,101,128 A | 3/1992 | Veronesi et al. |
| 2001/0051098 A1 | 12/2001 | Kenney et al. |
| 2002/0140564 A1 | 10/2002 | Danyluk et al. |

(Continued)

FOREIGN PATENT DOCUMENTS

| CN | 103904810 A | 7/2014 |
| CN | 108001660 A | 5/2018 |

(Continued)

OTHER PUBLICATIONS

DE-102009029716-A1, Hasenkamp, all pages (Year: 2009).*

(Continued)

*Primary Examiner* — Naishadh N Desai
(74) *Attorney, Agent, or Firm* — Knobbe, Martens, Olson, & Bear, LLP

(57) ABSTRACT

The disclosure relates to an electrical motor comprising a stator (101) being a stationary part in the electrical motor, the stator (101) having a plurality of poles mounted in a radial direction, a rotor (102) having a plurality of magnets and arranged to rotate freely around the stator (101), the stator (101) and the rotor (102) are moulded into an epoxy layer of a housing of the motor in such a way that a channel (106) is formed allowing a cooling medium flowing through the internal part of the electrical motor.

7 Claims, 4 Drawing Sheets

(56) References Cited

U.S. PATENT DOCUMENTS

| | | | | |
|---|---|---|---|---|
| 2006/0175920 A1* | 8/2006 | Shimada | ................. | B23Q 1/70 |
| | | | | 310/90.5 |
| 2010/0052325 A1* | 3/2010 | Perner | ....................... | F03D 9/25 |
| | | | | 290/55 |
| 2013/0106111 A1 | 5/2013 | Stornes et al. | | |
| 2014/0001893 A1* | 1/2014 | Van Dam | ................. | H02K 5/12 |
| | | | | 310/52 |

FOREIGN PATENT DOCUMENTS

| | | | | |
|---|---|---|---|---|
| DE | 102009029716 | | 12/2009 | |
| DE | 102009029716 A1 * | | 12/2009 | ............... H02K 1/32 |
| JP | 2003-193952 A | | 7/2003 | |
| JP | 2005-168194 A | | 6/2005 | |
| JP | 2007-321703 A | | 12/2007 | |
| JP | 2009-171669 A | | 7/2009 | |
| WO | WO 00/74214 A1 | | 12/2000 | |
| WO | WO 2021/049999 A1 | | 3/2021 | |

OTHER PUBLICATIONS

International Search Report and Written Opinion, for International Application No. PCT/SE2020/050857, dated Dec. 3, 2020, in 13 pages.

First Office Action, for Swedish Application No. 1951033-8, dated Feb. 28, 2020, in 6 pages.

Second Office Action, for Swedish Application No. 1951033-8, dated Apr. 19, 2021, in 4 pages.

International Search Report and Written Opinion, for International Application No. PCT/SE2022/050826, mailed on Oct. 19, 2022.

Office Action and Search Report in Swedish Application No. 2151150-6, dated May 11, 2022.

Office Action received in Japanese Application No. 2022-512361 dated May 13, 2024.

Office Action received in Korean Application No. 10-2022-7011095 dated Jun. 26, 2024.

* cited by examiner

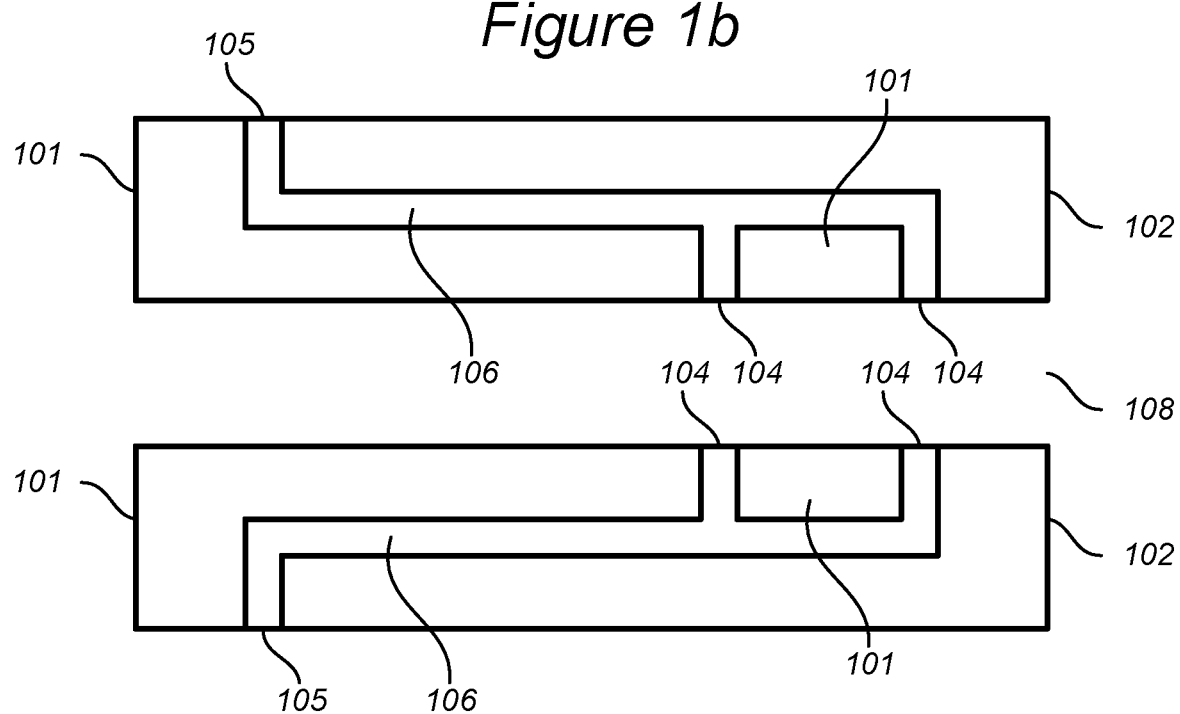
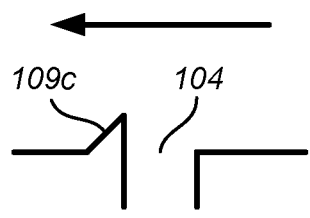 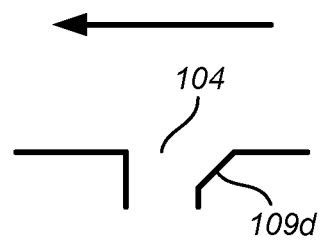

ELECTRICAL MOTOR WITH AN INTRINSIC COOLING SYSTEM

TECHNICAL FIELD

The present disclosure generally relates to the field of electric motors. In particular, it relates to a system for cooling electrical motors, specifically external rotor motors.

BACKGROUND ART

In recent years, there has been a growing interest in using electrical motors in different applications, such as electrical cars, drones, boats, pumps, etc. There are plenty of different types of electrical motors; some examples are synchronous or asynchronous motors, DC or AC motors, brushed or brushless motors, inrunner or outrunner motors.

In general terms, an electrical motor is an electrical machine that converts electrical energy into mechanical energy in the form of a rotation. Electrical motors operate through the interaction between the motor's magnetic field and an electromagnetic field generated from an electrically induced wire winding. The interaction between these magnetic fields is a rotating electromagnetic field, which in turn generates a rotational force so called torque e.g. in the form of a rotation of a shaft.

There are various types of motors in the market but in this disclosure, we are mainly focusing on electrical brushless DC electrical motors with external rotors, so called outrunners.

A typical configuration of an outrunner is comprising a stator with windings or poles located in the centre of the motor and a rotor with permanent magnets adapted to spin around the stator. This configuration has usually a larger diameter than other types of electric motors and allows more windings, poles or magnets to be placed in the rotor, increasing the rotational magnetic field.

Furthermore, a large diameter creates a large circumference for the motor to travel in one rotation. The larger diameter also represents a larger moment arm for an outrunner and consequently a high torque. The larger moment arm for an outrunner may provide a higher torque at equivalent speed.

A known problem with an outrunner is that heat from the stator poles is transferred to the centre of the motor, resulting in overheating the outrunner and limiting the maximum power that can be applied to it. In addition, too much heat weakens the magnets and damages the windings or poles' insulation, limiting vastly the number of applications where outrunners can be implemented.

SUMMARY OF THE INVENTION

It is an object of the present disclosure to mitigate, alleviate or eliminate one or more of the above-identified deficiencies and disadvantages in the prior art and solve at least the above mentioned problem.

According to a first aspect there is provided an electrical motor comprising a housing having a stationary internal part and a rotatable external part, a stator mounted on the stationary internal part of the housing, a rotor attached to the rotatable external part of the housing, the rotor is arranged to rotate freely around the stator, characterized in that the rotatable external part has at least one inlet configured to receive a cooling medium, and at least one outlet configured to evacuate the cooling medium, the stator and the rotor are each separately moulded in respective epoxy layers, and a channel arranged between the moulded rotor and the moulded stator to conduct the cooling medium in an axial direction of the housing and to be in fluid communication with the at least one inlet and the at least one outlet forming an intrinsic cooling system of the electrical motor.

The epoxy layer is protecting the stator and the rotor from any liquid leaking into the electrical circuit. This is achieved by moulding the stator in an epoxy layer and the rotor in another epoxy layer so no additional sealing is then needed.

This channel or passage between the stator and the rotor allows the cooling medium to pass through so the internal part of the rotor that faces the stator can decrease in temperature.

The combination of the use of an electric motor that can reach a high torque force with an intrinsic cooling system according to this disclosure provides an electrical motor which does not need a gear box and that is far more efficient than previous versions of electric motors and allows a higher power-density than previous motor designs.

In addition, no additional sealing is needed which provides robustness to the motor and diminishes standard wear parts.

Further, the channel is formed to allow a cooling medium to flow through the electrical motor, and to fluidly communicate with at least one inlet adapted to introduce the cooling medium to the channel, and at least one outlet adapted to discharge the cooling medium from the channel by means of centrifugal force during the rotation of the rotor.

Further, the at least one outlet may be evacuating the cooling medium by means of centrifugal force generated during a rotation of the rotor.

Since the rotor is on the external part of the housing, it is possible to evacuate the cooling medium via the at least on outlet placed on the external part of the housing when rotating the rotor. The rotational force or centrifugal force may be then used to eject the cooling medium from the outlets when the electric motor is in operation. By doing this way, the cooling medium is continuously moving from the at least one inlet to the at least one outlet so the cooling medium is kept at a low temperature at all times.

According to some embodiments, the motor may further comprise an additional channel. The additional channel may be arranged to allow a cooling medium to flow through the motor. The additional channel may for example extend axially through a centre of the motor. The additional channel may for example extend axially through a centre of the stationary internal part of the housing. By providing an additional channel, cooling medium may flow through the motor.

According to some embodiments, the electrical motor may comprise at least one outlet, which may be placed on the external part of the housing and adapted to discharge the cooling medium from the channel by means of centrifugal force during rotation of the rotor.

According to some embodiments, the electrical motor may comprise a housing, a stator, a rotor, a channel, and at least one outlet. The housing may have a stationary internal part and a rotatable external part. The stator may be supported by the stationary internal part of said housing. The rotor may be attached to said rotatable external part of said housing, and said rotor may be arranged to rotate freely around the stator. The rotatable external part may have at least one inlet configured to receive a cooling medium, and at least one outlet configured to evacuate the cooling medium. The stator and the rotor may each be separately moulded in respective epoxy layers. The channel may be arranged between the moulded rotor and the moulded stator to conduct the cooling medium in an axial direction of the housing and to be in fluid communication with the at least one inlet and with the at least one outlet, forming an intrinsic cooling system of the electrical motor. The at least one outlet may be placed on the external part of the housing and adapted to discharge the cooling medium from the channel by means of centrifugal force during rotation of the rotor.

According to some embodiments, the at least one inlet may be arranged on an inner surface of the stationary internal part. By having the at least an inlet on the inner surface of the stationary internal part, the flow of cooling medium through the channel can be improved. For example by means of centrifugal force or by the rotational force generated during a rotation of the rotor, cooling medium may be pushed towards the at least one inlet. In addition, the cooling medium evacuated from the at least one outlet can, via the channel, result in a suction at the at least one inlet. According to some embodiments, the at least one inlet may be arranged on the stator towards the additional channel. By having the at least one inlet on the inner surface of the stationary internal part, the flow of cooling medium through the channel can be improved. For example by means of centrifugal force or by the rotational force generated during a rotation of the rotor, cooling medium may be pushed from the additional channel towards the at least one inlet. In addition, the cooling medium evacuated from the at least one outlet can, via the channel, result in a suction at the at least one inlet.

According to some embodiments, the at least one inlet may be provided with fluid directing means, such as an extending portion located at the edge of the inlet to direct the flowing cooling medium to the inlet. The extended portion can be located on the part of the inlet that is downstream or after the inlet as seen by flowing cooling medium. The extended portion may further have a concave surface to further direct flowing cooling medium towards the inlet.

According to some embodiments, the at least one inlet may be provided with fluid directing means, such as an indented portion located at the edge of the inlet to direct the flowing cooling medium to the inlet. The indented portion can be located on the part of the inlet that is upstream or before the inlet as seen by flowing cooling medium. The extended portion may further have a concave surface to further direct flowing cooling medium towards the inlet.

According to some embodiments, the location of the fluid directing means may be decided based on the direction of the flow of cooling medium during operation of the motor. According to some embodiments, the additional channel may be or be referred to as a central channel and/or motor channel.

According to some embodiments, the electrical motor may comprise a housing, a stator, a rotor and a channel. The housing may have a stationary internal part and a rotatable external part. The stator may be supported by the stationary internal part of said housing. The rotor may be attached to said rotatable external part of said housing, and said rotor may be arranged to rotate freely around the stator. The rotatable external part may have at least one inlet configured to receive a cooling medium, and at least one outlet configured to evacuate the cooling medium. The stator and the rotor may each be separately moulded in respective epoxy layers. The channel may be arranged between the moulded rotor and the moulded stator to conduct the cooling medium in an axial direction of the housing and to be in fluid communication with the at least one inlet and with the at least one outlet, forming an intrinsic cooling system of the electrical motor.

Further, the intrinsic cooling system may comprise an additional channel axially extended through a centre of the stationary internal part of the housing and arranged to allow a cooling medium to flow through.

Further, some of the outlets may be aligned around a circumference of the rotating external part of the housing.

In the case the outlets are aligned around the circumference of the external part of the housing, the cooling medium is evacuated in a distributed way around the surface of the external part.

Further, the rotating external part of the housing is at least partially cylindrical.

The partially cylindrical shape allows the cooling medium to flow in an axial direction so a great part of the internal motor is cooled down.

Further, the outlets are any of round openings, slits and conical openings. The shape is depending on e.g. the thickness of the cooling medium or the positions of the magnets in the rotor. The flexibility in the configuration of the electric motor provides optimal efficiency.

According to some embodiments, the epoxy layer may be at least partially electrically insulating. For example, the at least partially electrically insulating epoxy layer may have electrically insulating properties of more than 100 ohm per mm thickness. The electrically insulating epoxy layer may also have electrically insulating properties of more than 1 kohm per mm thickness, 10 kohm per mm thickness, 100 kohm per mm thickness, 1 Mohm per mm thickness, 10 Mohm per mm thickness, 100 Mohm per mm thickness, 1000 Mohm per mm thickness, or 10000 Mohm per mm thickness.

According to some embodiments, the epoxy layer may be electrically insulating. For example, the electrically insulating epoxy layer may have electrically isolating properties of more than 100 ohm per mm thickness. The electrically insulating epoxy layer may also have electrically insulating properties of more than 1 kohm per mm thickness, 10 kohm per mm thickness, 100 kohm per mm thickness, 1 Mohm per mm thickness, 10 Mohm per mm thickness, 100 Mohm per mm thickness, 1000 Mohm per mm thickness, or 10000 Mohm per mm thickness.

According to some embodiments, the epoxy layer may be at least partially thermally conductive. For example, the at least partially thermally conductive epoxy layer may have thermally conductive properties of more than 0.5 watt per milli Kelvin (W/mK). The thermally conductive epoxy layer may also have conductive properties of 1 W/mK.

According to some embodiments, the epoxy layer may be thermally conductive. For example, the thermally conductive epoxy layer may have thermally conductive properties of more than 0.5 watt per milli Kelvin (W/mK). The thermally conductive epoxy layer may also have conductive properties of 1 W/mK.

According to some embodiments, the epoxy layer may be at least partially thermally conductive and electrically insulating. For example, the at least partially electrically insulating epoxy layer may have electrically insulating properties of more than 100 ohm per mm thickness. The electrically insulating epoxy layer may also have electrically insulating properties of more than 1 kohm per mm thickness, 10 kohm per mm thickness, 100 kohm per mm thickness, 1 Mohm per mm thickness, 10 Mohm per mm thickness, 100 Mohm per mm thickness, 1000 Mohm per mm thickness, or 10000 Mohm per mm thickness. For example, the at least partially thermally conductive epoxy layer may have thermally conductive properties of more than 0.5 watt per milli Kelvin (W/mK). The thermally conductive epoxy layer may also have conductive properties of 1 W/mK.

According to some embodiments, the epoxy layer may be thermally conductive and electrically insulating. For example, the electrically insulating epoxy layer may have electrically insulating properties of more than 100 ohm per mm thickness. The electrically insulating epoxy layer may also have electrically insulating properties of more than 1 kohm per mm thickness, 10 kohm per mm thickness, 100 kohm per mm thickness, 1 Mohm per mm thickness, 10 Mohm per mm thickness, 100 Mohm per mm thickness, 1000 Mohm per mm thickness, or 10000 Mohm per mm thickness. For example, the thermally conductive epoxy layer may have thermally conductive properties of more than 0.5 watt per milli Kelvin (W/mK). The thermally conductive epoxy layer may also have conductive properties of 1 W/mK. According to some embodiments, the epoxy layer may have a low viscosity, such as in the span of 1400 to 2200 cPs at 23 degrees Celcius and 100 rpm. The expoxy layer may further be homogeneous and/or thermally stable.

According to some embodiments, the epoxy layer may curable in room temperature.

According to some embodiments, the electrical motor may comprise a housing, a stator, a rotor and a channel. The housing may have a stationary internal part and a rotatable external part. The stator may be supported by the stationary internal part of said housing. The rotor may be attached to said rotatable external part of said housing, and said rotor may be arranged to rotate freely around the stator. The rotatable external part may have at least one inlet configured to receive a cooling medium, and at least one outlet configured to evacuate the cooling medium. The stator and the rotor may each be separately moulded in respective epoxy layers. The channel may be arranged between the moulded rotor and the moulded stator to conduct the cooling medium in an axial direction of the housing and to be in fluid communication with the at least one inlet and with the at least one outlet, forming an intrinsic cooling system of the electrical motor. The epoxy layers may be thermally conductive and electrically insulating.

Further, the electric motor is arranged to operate in submersed state and the cooling medium is water.

The advantage of arranging the motor to operate in a submersed state is that it can be used in naval or marine applications such as submarines, boats and pumps. In addition, no additional container with a cooling medium is required facilitating the operation of the electric motor.

According to some embodiments, the plurality of magnets of the rotor may be arranged in a magnetization pattern which concentrates their combined magnetic flux to the centre of the rotor. The rotor may be hollow, for example having a cylindrical shape, the magnetic flux may then be concentrates to the hollow centre of the cylindrical rotor. The hollow centre may comprise additional components.

According to some embodiments, the plurality of magnets of the rotor may be arranged in a Halbach configuration, thereby directing the magnetic field strength towards the centre of the rotor. By directing the magnetic field a more efficient and/or compact arrangement of the magnets may be achieved, by this the size of the cooling fluid channel between stator and rotor can be maximized without reduced motor efficiency. The rotor may be hollow, for example having a cylindrical shape, the magnetic flux may then be concentrates to the hollow centre of the cylindrical rotor. The hollow centre may comprise additional components.

According to some embodiments, the magnets may comprise a high flux alloy, such as for example Neodymium steel.

According to some embodiments, magnets arranged in a Halbach configuration may be arranged in a spatially rotating pattern of magnetisation to augment the magnetic field on one side of the configuration while cancelling the field to near zero on the other side of the configuration.

According to some embodiments, the electrical motor may be comprising a housing, a stator, a rotor and a channel. The housing may have a stationary internal part and a rotatable external part. The stator may be supported by the stationary internal part of said housing. The rotor may be attached to said rotatable external part of said housing, and said rotor may be arranged to rotate freely around the stator. The rotor may comprise magnets arranged in a Halbach configuration. The rotatable external part may have at least one inlet configured to receive a cooling medium, and at least one outlet configured to evacuate the cooling medium.

The stator and the rotor may each be separately moulded in respective epoxy layers. The channel may be arranged between the moulded rotor and the moulded stator to conduct the cooling medium in an axial direction of the housing and to be in fluid communication with the at least one inlet and with the at least one outlet, forming an intrinsic cooling system of the electrical motor.

According to some embodiments, the motor may further comprise at least one propeller. The at least one propeller may be arranged on a rotatable part of the motor, such as the rotor and/or in connection with the rotor. By this, the rotary force that the electric motor may produce on the rotor may be converted into thrust by a rotational motion of the rotor and the propellers.

According to some embodiments, the motor may further comprise a propeller connector, wherein the propeller connector is arranged to be connected to at least one propeller.

According to some embodiments, the propeller may comprise a hub and a plurality of radiating blades that are set at a pitch to form a helical spiral to, when rotated, transform rotational power into linear thrust by acting upon a working fluid, such as water.

According to some embodiments, the propeller may be a screw propeller.

According to some embodiments, the propeller may be arranged to operate submersed in water.

According to some embodiments, the motor may further comprise an impeller.

According to some embodiments, the electrical motor may be comprising a housing, a stator, a rotor, a channel, and a propeller. The housing may have a stationary internal part and a rotatable external part. The stator may be supported by the stationary internal part of said housing. The rotor may be attached to said rotatable external part of said housing, and said rotor may be arranged to rotate freely around the stator. The rotatable external part may have at least one inlet configured to receive a cooling medium, and at least one outlet configured to evacuate the cooling medium. The stator and the rotor may each be separately moulded in respective epoxy layers. The channel may be arranged between the moulded rotor and the moulded stator to conduct the cooling medium in an axial direction of the housing and to be in fluid communication with the at least one inlet and with the at least one outlet, forming an intrinsic cooling system of the electrical motor. The propeller may be arranged on the rotor and the epoxy layer may be thermally conductive and electrically insulating.

According to some embodiments, the electrical motor may be comprising a housing, a stator, a rotor, a channel, and a propeller. The housing may have a stationary internal part and a rotatable external part. The stator may be supported by the stationary internal part of said housing. The rotor may be attached to said rotatable external part of said housing, and said rotor may be arranged to rotate freely around the stator. The rotatable external part may have at least one inlet configured to receive a cooling medium, and at least one outlet configured to evacuate the cooling medium. The stator and the rotor may each be separately moulded in respective epoxy layers. The channel may be arranged between the moulded rotor and the moulded stator to conduct the cooling medium in an axial direction of the housing and to be in fluid communication with the at least one inlet and with the at least one outlet, forming an intrinsic cooling system of the electrical motor. The propeller may be arranged on the rotor.

According to some embodiments, the motor may comprise a second housing and be arranged in a jet configuration. The second housing may be arranged to at least partially enclose the motor and the propeller, thereby creating a surrounding channel between the second housing and the rotor, in which the propeller can interact with the liquid.

According to some embodiments, the motor may be arranged with the rotor within the hollow stator and the propeller arranged within the hollow rotor. By this arrangement, the propeller can interact with fluid transported within the additional channel. By protecting the propeller inside the motor, a more durable motor may be provided.

According to some embodiments, the motor may be arranged with the rotor within the hollow stator and the propeller arranged within the hollow rotor. By this arrangement, the motor can drive the propeller from a location surrounding the propeller. Such an arrangement can be used to enable a more easily constructed jet configuration by providing the motor drive close to the housing, in contrast to a centrally located drive.

According to some embodiments, the motor may comprise a second housing and be arranged in a jet configuration. The second housing may be arranged to at least partially enclose the motor and the propeller, thereby creating a surrounding channel between the second housing and the rotor, in which the propeller can interact with the liquid.

According to some embodiments, an electrical motor for powering a craft in water is provided. The craft may for example be a boat, a jet ski, a ship, a submarine or similar. The motor may provide power on a propeller and operate in a submersed state. The motor is described in any herein disclosed embodiment.

According to some embodiments, the electrical motor may be arranged as an outboard engine, an inboard engine, or as a pod.

According to some embodiments, the electrical motor may further comprise mounting means, wherein the mounting means are suitable for mounting the motor to the boat. For example, the motor may be mounted on a transom, a stern, a hull, a rudder and/or a hydrofoil.

According to some embodiments, the electrical motor may be configured to be mounted on, for example, a transom, a stern, a hull, a rudder and/or a hydrofoil.

The present invention will become apparent from the detailed description given below. The detailed description and specific examples disclose preferred embodiments of the invention by way of illustration only. Those skilled in the art understand from guidance in the detailed description that changes and modifications may be made within the scope of the invention.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

Terminology—The term "channel" is to be interpreted as a gap, passage or space conveying a liquid from a starting place to an end place.

BRIEF DESCRIPTION OF THE DISCLOSURE

The above objects, as well as additional objects, features and advantages of the present disclosure will be more fully appreciated by reference to the following illustrative and non-limiting detailed description of example embodiments of the present invention, when taken in conjunction with the accompanying drawings.

FIG. 1b shows a schematic section view of the electrical motor according to an example of the present disclosure.

FIG. 1c shows a schematic section view of an inlet according to an example of the present disclosure.

FIG. 1d shows a schematic section view of an inlet according to an example of the present disclosure.

DETAILED DESCRIPTION

The present invention will now be described with reference to the accompanying drawings, in which preferred example embodiments of the invention are shown. The invention may, however, be embodied in other forms and should not be construed as limited to the herein disclosed embodiments. The disclosed embodiments are provided to fully convey the scope of the invention to the skilled person.

Figure 1:
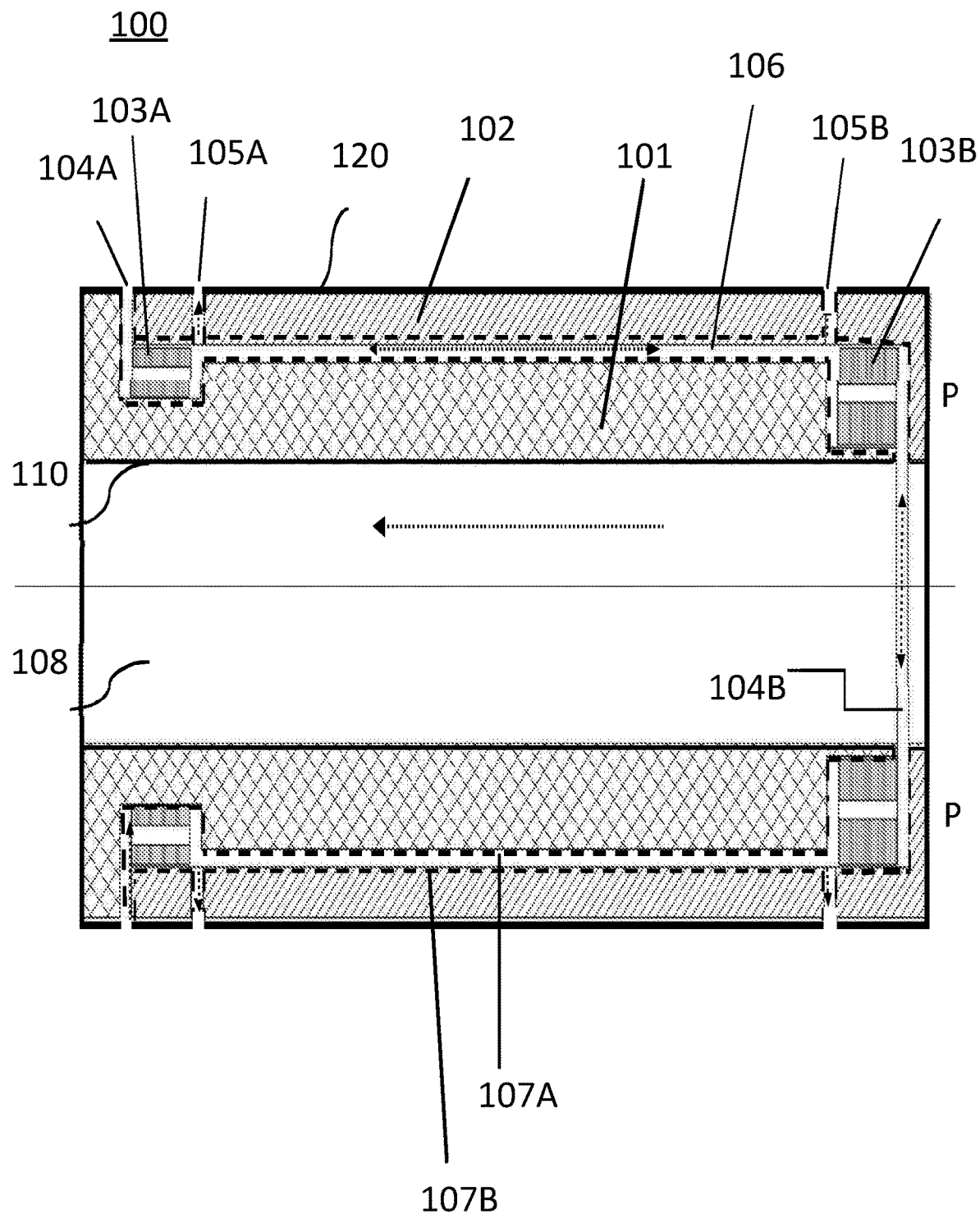
FIG. 1 shows a section view of the electrical motor according to an example of the present disclosure.

FIG. 1 shows a section view of an electrical motor according to an example of an embodiment of the present disclosure. The electrical motor comprises a housing 100 made of non-oxidable material and having a rotating external part 120, which is at least partially cylindrical. However, different variations of the shape may also be possible. For instance, a partially cylindrical shape with conical ends or round ends are also considered as viable options.

The housing 100 has a stationary internal part 110 and a rotatable external part 120 and is comprising a stator 101 supported by the stationary internal part 110 and a rotor 102 attached to the rotatable external part 120. The rotor is arranged to rotate freely around the stator 101.

The stator 101, which is supported by the stationary internal part 110, comprises a stator core having a plurality of poles placed in a radial direction and windings or conductors mounted on each pole. The rotating external part of the housing 120 accommodates the rotor 102 containing a plurality of permanent magnets. The rotor 102 is also attached to the stator 101 at both ends of the housing 100 by means of a ball bearings 103A, 103B or any similar element in order to rotate freely around the stator and leaving a channel 106 between each other. The size of the channel 106 may vary depending on the results to be achieved. In order to obtain an efficient electric motor, the electromagnetic field in the channel 106 between the rotor and stator needs to be as little as possible. At the same time, the cooling system will be more efficient if the channel 106 is as large as possible. Accordingly, a balance between both constraints will bring the best approach for obtaining an efficient electric motor.

When the stator is operating with a rotor 102 and powered by a direct current DC, the electric current in the poles interacts with the motor's magnetic field generated from the plurality of magnets of the rotor 102 obtaining a rotational force or torque, which rotates the rotor. The motor may be attached to a propeller shaft or any other rotatable shaft depending on the application of the electric motor.

As seen in dashed lines in the FIG. 1, the stator 101 and the rotor 102 are each separately moulded in respective epoxy layers 107A, 107B. In other words, the stator is encapsulated or moulded in an epoxy layer 107A which prevents and protects the stator from damages caused by any cooling medium, such as water. However, it does not necessarily need to be an epoxy layer but any other layer e.g. plastic or resin that will protect the stator and rotor from damages e.g. by entering water and dust.

As for the stator 101, the rotor 102 is also encapsulated or moulded into an epoxy layer 107B to prevent any humidity, rust, dust, cooling medium or water from entering the internal parts of the rotor. The encapsulation of the rotor 102 and the stator 101 in separate epoxy layers makes the channel 106 between the rotor 102 and the stator 101 isolated and sealed from the internal parts of the stator and the rotor. This isolation or seal allows a cooling medium such as water to flow through the channel 106 with at least an inlet 104A, 104B and at least an outlet 105A, 105B. The exemplary embodiment of FIG. 1 shows a rotatable external part 100 with at least one inlet 104A, 104B at the joints of each bearing 103A, 103B attached at each end of the housing 100. These inlets 104A, 104B are configured to receive a cooling medium and may be natural inlets caused by joints when using bearings for attaching the rotor 102 to the stator 101 or other edge differences between the stator and the rotor. The cooling medium may be introduced via at least one inlet 104A, 104B in different ways dependent on the application of the electrical motor.

In some embodiments, the application of the electrical motor is outside a water environment, and the cooling medium is then introduced from an external container via an inlet, such as a joint in relation to bearings or any other suitable supporting element, and reintroduced into the container via any of the outlets explained below.

Back to FIG. 1, the cooling medium such as water flows in through the inlets 104A, 104B and through a channel 106. The channel 106 is arranged between the moulded rotor and the moulded stator to conduct the cooling medium in an axial direction of the housing 100 and to be in fluid communication with the at least one inlet 104A, 104B and the at least one outlet 105A, 105B forming an intrinsic cooling system of the electrical motor. The intrinsic cooling system is configured to cool down the internal parts of the motor. The introduced cooling medium is then ejected from the channel 106 via at least one outlet 105A, 105B on the rotatable external part 120 of the housing and configured to evacuate the cooling medium by means of centrifugal force or also called rotational force generated during a rotation of the rotor 102.

The outlets 105A, 105B are openings that go through both the rotating external part of the housing 120 and the rotor 102 and are in fluid communication with the internal channel 106. The shape of the outlets 105A, 105B are any of round openings, slits, square-shaped, star-shaped, boreholes, and conical openings or any type of opening of a small diameter aligned in a circular ring or around a circumference of the rotating external part of the housing 120. The outlet 105A, 105B may be just one or many and may be placed anywhere in the rotating external part of the housing 120.

However, the magnets placed inside the rotor are limiting the space available for placing these outlets. Accordingly, the location of the outlets and the spaces between each other may vary as well as the size of the diameter of each outlet.

FIG. 1b shows a schematic illustration of a subset of an electrical motor, the subset showing a stator 101 and a rotor 102. The stator and rotor are part of the electrical motor and is arranged in a rotational symmetry. In the centre of the figure an additional channel 108 is shown. The additional channel is axially extended through a centre of the electrical motor and arranged to allow a cooling medium to flow through the interior of the stator 101. The additional channel 108 runs along a motor axis of the electrical motor. The inverted electrical motor configuration hence comprises a central channel 108 for cooling medium, herein referred to as an additional channel, running through the centre of the inner stator 101, along the motor axis of the electrical motor. The figure further shows a channel 106 arranged between the rotor and the stator to conduct cooling medium at least partly in an axial direction of the motor and to be in fluid communication with the at least one inlet 104 and with the at least one outlet 105, forming an intrinsic cooling system of the electrical motor. The at least one inlet 104 is shown arranged on an inner surface of the stator 101. The inner surface is facing the additional channel 108. The at least one outlet 105 is arranged on an outer surface of the rotor 102. The figure illustrates four inlets and two outlets, However, it should be realized that this is shown as an example and that other combinations are possible. The stator and/or rotor may be provided with inlets and/or outlets that is located on the stator and/or rotor, and/or at the rim between them. The figure shows inlets 104 located on the stator 101.

FIG. 1c shows a schematic illustration of an inlet 104 having an extending portion 109c located at an edge of the inlet to direct the flowing cooling medium towards the inlet 104. The extending portion is located at the downstream-side of the inlet 104 in the direction of flow of the cooling medium. The extending portion may have different shapes, of which the illustrated triangular shape is merely an example. In the illustrated example, the extending portion protrudes from the inner surface of the stator into the additional channel 108 to increase a flow of cooling medium from the additional channel into the channel 106 of the intrinsic cooling system, via the inlet 104.

FIG. 1d shows a schematic illustration of an inlet 104 having an indented portion 109d located at the edge of the inlet to direct the flowing cooling medium towards the inlet 104. The indented portion 109d is located at the upstream-side of the inlet 104 in the direction of flow of the cooling medium. The indented portion may have different shapes, of which the illustrated triangular cut-out shape is an example. In the illustrated example, the indented portion forms a recess in the inner surface of the stator to increase a flow of cooling medium from the additional channel into the channel 106 of the intrinsic cooling system, via the inlet 104.

In another exemplary embodiment, the electrical motor is able to operate in a submersed or an immersed state and can be used in various applications such as in dredging pumps, deep well pumps, sewage pumps, boats, ships or submarines.

The electrical motor may further be arranged to operate in submersed state and the cooling medium may be water. For a submersible electrical motor, the cooling system described above may be enhanced by having an additional channel 108 axially extended through a centre of the stationary internal part of the housing and arranged to allow a cooling medium to flow through. The centre of the stationary internal part 110 is hollow to allow water flow through the external part of the stator 101 in an axial direction. The water may be introduced through the hollow part of the housing via fans or propellers P placed on the external front part of the rotor 102. The water is then conducted in an axial direction of the housing towards the backside of the electric motor as shown in FIG. 1 and FIG. 3. The hollow part or additional channel 108 may be configured as being a single channel or a plurality of small channels or openings parallel to each other capable of allowing water to flow through. The more water passes through the additional channel, the colder the electric motor becomes.

In another exemplary embodiment, the electrical motor is outside a water environment, the additional channel 108 is then closed or sealed at both ends leaving an empty space inside the motor with access to at least one inlet for introducing a cooling medium from an external container and to at least one outlet to discharge the cooling medium to the same or to another external container. The cooling medium when introduced in this additional channel 108 is cooling the internal part of the motor, specifically the rotating external part of the stator. Other variations of the introduction or ejection of the cooling medium are also possible.

The motor may further comprise an additional channel 108. The additional channel 108 may be arranged to allow a cooling medium to flow through the motor. The additional channel 108 may for example extend axially through a centre of the motor. The additional channel may for example extend axially through a centre of the stationary internal part of the housing. By providing an additional channel, cooling medium may flow through the motor.

The electrical motor may comprise at least one outlet, which may be placed on the external part of the housing and adapted to discharge the cooling medium from the channel by means of centrifugal force during rotation of the rotor.

In another exemplary embodiment, the electrical motor may comprise a housing, a stator, a rotor, a channel, and at least one outlet. The housing may have a stationary internal part and a rotatable external part. The stator may be supported by the stationary internal part of said housing. The rotor may be attached to said rotatable external part of said housing, and said rotor may be arranged to rotate freely around the stator. The rotatable external part may have at least one inlet configured to receive a cooling medium, and at least one outlet configured to evacuate the cooling medium. The stator and the rotor may each be separately moulded in respective epoxy layers. The channel may be arranged between the moulded rotor and the moulded stator to conduct the cooling medium in an axial direction of the housing and to be in fluid communication with the at least one inlet and with the at least one outlet, forming an intrinsic cooling system of the electrical motor. The at least one outlet may be placed on the external part of the housing and adapted to discharge the cooling medium from the channel by means of centrifugal force during rotation of the rotor.

The at least one inlet may be arranged on an inner surface of the stationary internal part.

The at least one inlet may be arranged on the stator towards the additional channel.

The at least one inlet may be provided with fluid directing means, such as an extending portion located at the edge of the inlet to direct the flowing cooling medium to the inlet. The extended portion can be located on the part of the inlet that is after the inlet as seen by flowing cooling medium. The extended portion may further have a concave surface to further direct flowing cooling medium towards the inlet. According to some embodiments, the at least one inlet may be provided with fluid directing means, such as an indented portion located at the edge of the inlet to direct the flowing cooling medium to the inlet. The indented portion can be located on the part of the inlet that is before the inlet as seen by flowing cooling medium. The extended portion may further have a concave surface.

The location of the fluid directing means may be decided based on the direction of the flow of cooling medium during operation of the motor.

The additional channel 108 may be or be referred to as a central channel and/or motor channel.

In another exemplary embodiment, the electrical motor may comprise a housing, a stator, a rotor and a channel. The housing may have a stationary internal part and a rotatable external part. The stator may be supported by the stationary internal part of said housing. The rotor may be attached to said rotatable external part of said housing, and said rotor may be arranged to rotate freely around the stator. The rotatable external part may have at least one inlet configured to receive a cooling medium, and at least one outlet configured to evacuate the cooling medium. The stator and the rotor may each be separately moulded in respective epoxy layers. The channel may be arranged between the moulded rotor and the moulded stator to conduct the cooling medium in an axial direction of the housing and to be in fluid communication with the at least one inlet and with the at least one outlet, forming an intrinsic cooling system of the electrical motor.

Figure 2A:
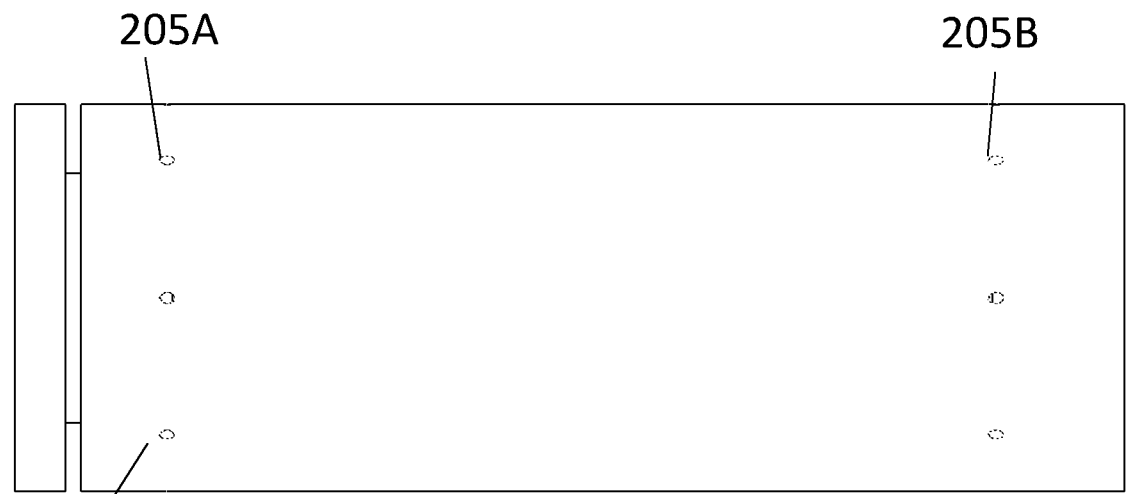
FIG. 2A shows an exploded view of the rotating external part of the housing of an example of an electrical motor according to the present disclosure.
Figure 2B:
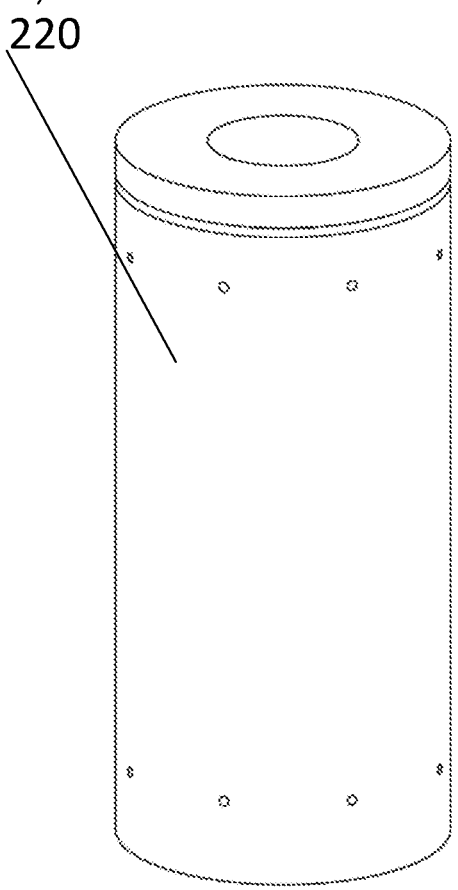
FIG. 2B shows a perspective view of the rotating external part of the housing of an example of an electrical motor according to the present disclosure.

FIG. 2A shows an exploded view and FIG. 2B shows a perspective view of the rotating external part of the housing 220 of an example of an electrical motor according to the present disclosure.

The housing 220 is of a cylindrical shape having an envelope surface, a top surface and a bottom surface. A series of openings 205A, 205B are seen on the external envelope surface of the housing 220. The openings 205A, 205B are outlets spaced apart from each other and aligned along each end side of the envelope surface, forming ring shapes around the external part of the housing, to allow cooling medium or water to be ejected during use from the stationary internal part of the housing. Each ring shape formed by outlets 205A or 205B is at different distances from inlets. These distances leave enough space for introduced cooling medium or water to flow through the stationary internal part of the housing to reduce the internal temperature of the external motor.

In some embodiments, only some outlets are aligned in a ring shape around the external part of the housing whilst others are placed on different parts of the external surface of the housing. In some examples outlets may be placed in the space between the permanent magnets of the rotor, i.e. in the middle part of the external surface and without necessarily forming a shape but in an adequate way that allows the water or cooling medium to be ejected from the housing. Other examples may only comprise one outlet placed anywhere in the external envelope surface 220.

Figure 2C:
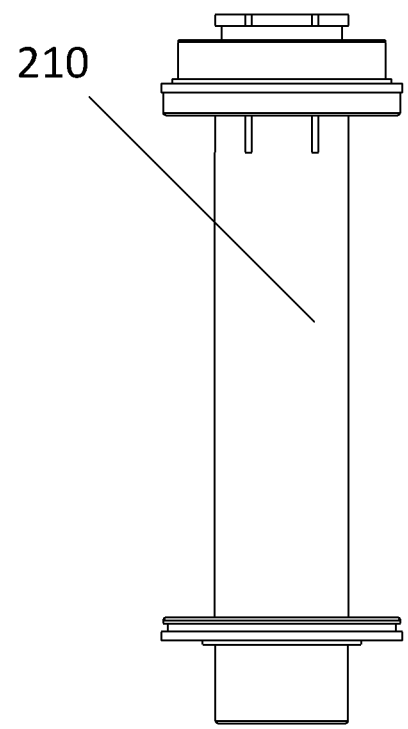
FIG. 2C shows a perspective view of the stationary internal part of the housing of an example of an electrical motor according to the present disclosure.

FIG. 2C shows a perspective view of the stationary internal part of the housing 210 of the electrical motor according to an example of the present disclosure.

The stationary internal part of the housing 210 supports the stationary part of the motor, i.e. the stator. The stationary internal part 210 comprises a hollow structure where the stator is mounted on after its encapsulation in an epoxy layer. Such epoxy layer is mouldable and protects any moulded device from any liquid, dust, sand or humidity.

The moulded stator is at least waterproof and dustproof. The same procedure is used for the rotor before mounting it on the stator by means of bearings. The bearings allow the rotor to rotate freely without friction leaving a channel, such as a space, cavity or gap between the stator and the rotor. Any liquid introduced to at least one inlet will be carried by the channel to at least one outlet where no leakage of the introduced liquid into the rotor or stator will occur.

The hollow part of the structure is large enough for the cooling medium or water to flow through the centre of the motor without obtaining a negative effect on the efficiency of the motor.

Figure 3A:
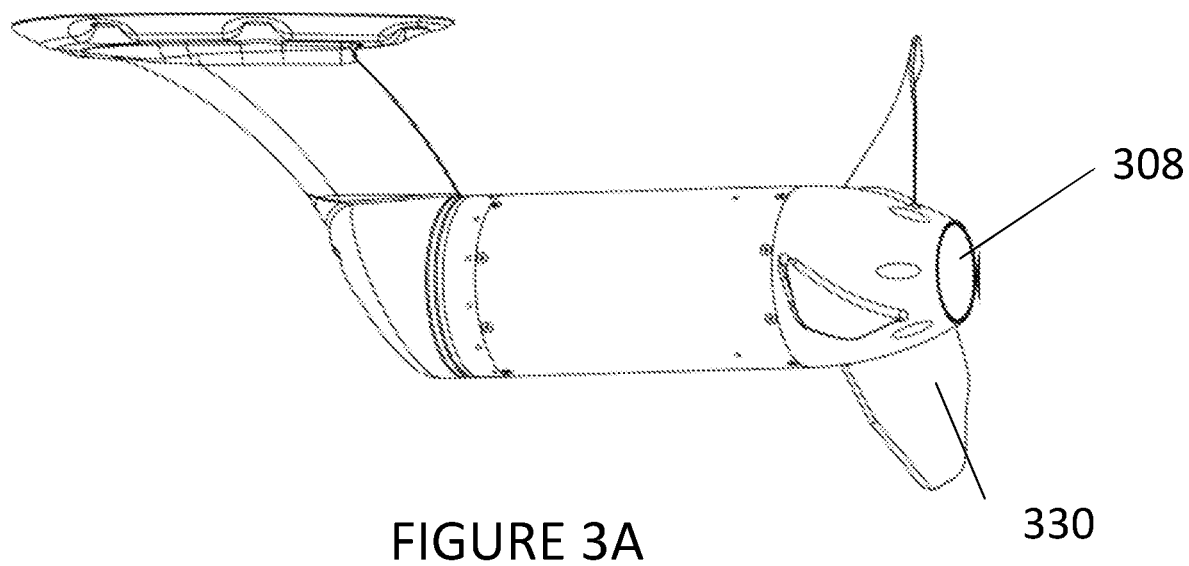
FIGS. 3A and 3B show perspective views of an example of an implementation of an electrical motor according to the present disclosure.
Figure 3B:
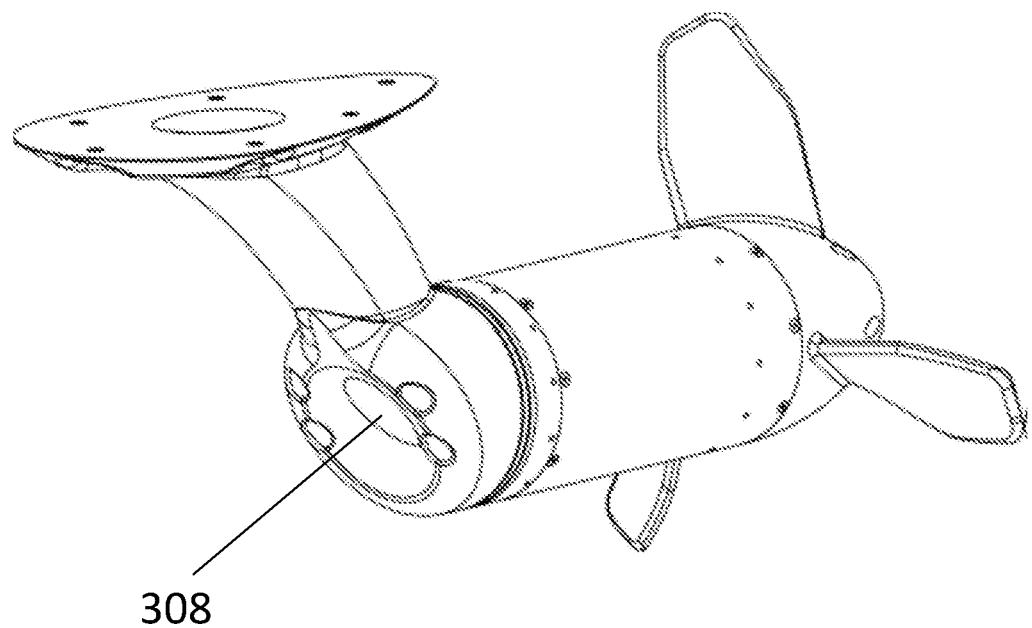

FIGS. 3A and 3B show an example of a boat motor comprising an electrical motor of the present disclosure.

The boat motor shown in FIG. 3A is an example of an implementation of the electric motor shown in FIG. 1 and attached to external propellers. In a frontal view, it can be seen that the propellers are placed in front of the electric motor on a shaft connected to the electric motor. The electric motor produces a rotary force or torque on the shaft intended to turn the propellers 330 to transmit power by converting rotational motion into thrust.

In other embodiments (not shown), the propellers may be attached on the rotating external part of the housing using the external rotation of an electric motor. Other configurations are also possible.

The shape of the blades of the propellers 330 are specifically designed to produce a pressure difference that accelerates water that passes through the propellers 330 when the motor is submersed in the water.

The cooled external water not only passes along the external surface of the electric motor but may also flows through an additional channel 308 inside the structure in order to reduce heat of the internal parts of the motor. FIG. 3B illustrates another view of the electrical motor showing the end of the additional channel 308 in the form of a tunnel or passage.

The epoxy layer may be at least partially electrically insulating. For example, the at least partially electrically insulating epoxy layer may have electrically insulating properties of more than 100 ohm per mm thickness. The electrically insulating epoxy layer may also have electrically insulating properties of more than 1 kohm per mm thickness, 10 kohm per mm thickness, 100 kohm per mm thickness, 1 Mohm per mm thickness, 10 Mohm per mm thickness, 100 Mohm per mm thickness, 1000 Mohm per mm thickness, or 10000 Mohm per mm thickness.

The epoxy layer may be electrically insulating. For example, the electrically insulating epoxy layer may have electrically isolating properties of more than 100 ohm per mm thickness. The electrically insulating epoxy layer may also have electrically insulating properties of more than 1 kohm per mm thickness, 10 kohm per mm thickness, 100 kohm per mm thickness, 1 Mohm per mm thickness, 10 Mohm per mm thickness, 100 Mohm per mm thickness, 1000 Mohm per mm thickness, or 10000 Mohm per mm thickness.

The epoxy layer may be at least partially thermally conductive. For example, the at least partially thermally conductive epoxy layer may have thermally conductive properties of more than 0.5 watt per milli Kelvin (W/mK). The thermally conductive epoxy layer may also have conductive properties of 1 W/mK.

The epoxy layer may be thermally conductive. For example, the thermally conductive epoxy layer may have thermally conductive properties of more than 0.5 watt per milli Kelvin (W/mK). The thermally conductive epoxy layer may also have conductive properties of 1 W/mK.

The epoxy layer may be at least partially thermally conductive and electrically insulating. For example, the at least partially electrically insulating epoxy layer may have electrically insulating properties of more than 100 ohm per mm thickness. The electrically insulating epoxy layer may also have electrically insulating properties of more than 1 kohm per mm thickness, 10 kohm per mm thickness, 100 kohm per mm thickness, 1 Mohm per mm thickness, 10 Mohm per mm thickness, 100 Mohm per mm thickness, 1000 Mohm per mm thickness, or 10000 Mohm per mm thickness. For example, the at least partially thermally conductive epoxy layer may have thermally conductive properties of more than 0.5 watt per milli Kelvin (W/mK). The thermally conductive epoxy layer may also have conductive properties of 1 W/mK.

The epoxy layer may be thermally conductive and electrically insulating. For example, the electrically insulating epoxy layer may have electrically insulating properties of more than 100 ohm per mm thickness. The electrically insulating epoxy layer may also have electrically insulating properties of more than 1 kohm per mm thickness, 10 kohm per mm thickness, 100 kohm per mm thickness, 1 Mohm per mm thickness, 10 Mohm per mm thickness, 100 Mohm per mm thickness, 1000 Mohm per mm thickness, or 10000 Mohm per mm thickness. For example, the thermally conductive epoxy layer may have thermally conductive properties of more than 0.5 watt per milli Kelvin (W/mK). The thermally conductive epoxy layer may also have conductive properties of 1 W/mK. According to some embodiments, the epoxy layer may have a low viscosity, such as in the span of 1400 to 2200 cPs at 23 degrees Celcius and 100 rpm. The expoxy layer may further be homogeneous and/or thermally stable.

The epoxy layer may be curable in room temperature.

According to some embodiments, the electrical motor may be comprising a housing, a stator, a rotor and a channel. The housing may have a stationary internal part and a rotatable external part. The stator may be supported by the stationary internal part of said housing. The rotor may be attached to said rotatable external part of said housing, and said rotor may be arranged to rotate freely around the stator. The rotatable external part may have at least one inlet configured to receive a cooling medium, and at least one outlet configured to evacuate the cooling medium. The stator and the rotor may each be separately moulded in respective epoxy layers. The channel may be arranged between the moulded rotor and the moulded stator to conduct the cooling medium in an axial direction of the housing and to be in fluid communication with the at least one inlet and with the at least one outlet, forming an intrinsic cooling system of the electrical motor. The epoxy layers may be thermally conductive and electrically insulating.

The plurality of magnets of the rotor may be arranged in a magnetization pattern which concentrates their combined magnetic flux to the centre of the rotor. The rotor may be hollow, for example having a cylindrical shape, the magnetic flux may then be concentrates to the hollow centre of the cylindrical rotor. The hollow centre may comprise additional components.

The plurality of magnets of the rotor may be arranged in a Halbach configuration, thereby directing the magnetic field strength towards the centre of the rotor. The rotor may further be hollow, for example having a cylindrical shape, the magnetic flux may then be concentrates to the hollow centre of the cylindrical rotor. The hollow centre may comprise additional components.

The magnets may comprise a high flux alloy, such as for example Neodymium steel.

The magnets arranged in a Halbach configuration may be arranged in a spatially rotating pattern of magnetisation to augment the magnetic field on one side of the configuration while cancelling the field to near zero on the other side of the configuration.

According to some embodiments, the electrical motor may comprise a housing, a stator, a rotor and a channel. The housing may have a stationary internal part and a rotatable external part. The stator may be supported by the stationary internal part of said housing. The rotor may be attached to said rotatable external part of said housing, and said rotor may be arranged to rotate freely around the stator. The rotor may comprise magnets arranged in a Halbach configuration. The rotatable external part may have at least one inlet configured to receive a cooling medium, and at least one outlet configured to evacuate the cooling medium. The stator and the rotor may each be separately moulded in respective epoxy layers. The channel may be arranged between the moulded rotor and the moulded stator to conduct the cooling medium in an axial direction of the housing and to be in fluid communication with the at least one inlet and with the at least one outlet, forming an intrinsic cooling system of the electrical motor.

The motor may further comprise at least one propeller. The at least one propeller may be arranged on a rotatable part of the motor, such as the rotor and/or in connection with the rotor.

The motor may further comprise a propeller connector, wherein the propeller connector is arranged to be connected to at least one propeller.

The propeller may comprise a hub and a plurality of radiating blades that are set at a pitch to form a helical spiral to, when rotated, transform rotational power into linear thrust by acting upon a working fluid, such as water.

The propeller may be a screw propeller.

The propeller may be arranged to operate submersed in water.

The motor may further comprise an impeller.

According to some embodiments, the electrical motor may comprise a housing, a stator, a rotor, a channel, and a propeller. The housing may have a stationary internal part and a rotatable external part. The stator may be supported by the stationary internal part of said housing. The rotor may be attached to said rotatable external part of said housing, and said rotor may be arranged to rotate freely around the stator. The rotatable external part may have at least one inlet configured to receive a cooling medium, and at least one outlet configured to evacuate the cooling medium. The stator and the rotor may each be separately moulded in respective epoxy layers. The channel may be arranged between the moulded rotor and the moulded stator to conduct the cooling medium in an axial direction of the housing and to be in fluid communication with the at least one inlet and with the at least one outlet, forming an intrinsic cooling system of the electrical motor. The propeller may be arranged on the rotor and the epoxy layer may be thermally conductive and electrically insulating.

According to some embodiments, the electrical motor may comprise a housing, a stator, a rotor, a channel, and a propeller. The housing may have a stationary internal part and a rotatable external part. The stator may be supported by the stationary internal part of said housing. The rotor may be attached to said rotatable external part of said housing, and said rotor may be arranged to rotate freely around the stator. The rotatable external part may have at least one inlet configured to receive a cooling medium, and at least one outlet configured to evacuate the cooling medium. The stator and the rotor may each be separately moulded in respective epoxy layers. The channel may be arranged between the moulded rotor and the moulded stator to conduct the cooling medium in an axial direction of the housing and to be in fluid communication with the at least one inlet and with the at least one outlet, forming an intrinsic cooling system of the electrical motor. The propeller may be arranged on the rotor.

The motor may comprise a second housing and be arranged in a jet configuration. The second housing may be arranged to at least partially enclose the motor and the propeller.

The motor may be arranged with the rotor within the hollow stator and the propeller arranged within the hollow rotor.

The motor may be arranged with the rotor within the hollow stator and the propeller arranged within the hollow rotor.

The motor may comprise a second housing and be arranged in a jet configuration. The second housing may be arranged to at least partially enclose the motor and the propeller.

The electrical motor may be suitable for powering a craft in water. The craft may for example be a boat, a jet ski, a ship, a submarine or similar. The motor may provide power on a propeller and operate in a submersed state.

The electrical motor may be arranged as an outboard engine, an inboard engine, or as a pod.

The electrical motor may further comprise mounting means, wherein the mounting means are suitable for mounting the motor to the boat. For example, the motor may be mounted on a transom, a stern, a hull, a rudder and/or a hydrofoil.

The electrical motor may be configured to be mounted on, for example, a transom, a stern, a hull, a rudder and/or a hydrofoil.

The electric motor according to the present disclosure may not only be used in marine or naval applications but other applications e.g. drones, electrical cars and all sorts of electrical toys. However, in non-naval applications, the water needs to be replaced by a cooling medium that can be introduced into a closed or sealed channel 308 by at least one inlet and ejected by at least one outlet (not shown in figures). Both, the at least one outlet and the at least one inlet may be connected to an external container or similar device containing the cooling medium. In some applications, the propellers need to be replaced by a fan or similar devices to operate properly.

The person skilled in the art realizes that the present invention is not limited to the preferred embodiments described above. The person skilled in the art further realizes that modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. An electrical motor comprising:
   a housing having a stationary internal part and a rotatable external part,
   a stator supported by the stationary internal part of said housing, and
   a rotor attached to said rotatable external part of said housing said rotor is arranged to rotate freely around the stator, wherein
   said rotatable external part has at least one inlet configured to receive a cooling medium, and at least one outlet configured to evacuate said cooling medium,
   said stator and said rotor are each separately moulded in respective epoxy layers, and
   a channel arranged between said moulded rotor and said moulded stator to conduct said cooling medium in an axial direction of said housing and to be in fluid communication with the at least one inlet and with the at least one outlet, forming an intrinsic cooling system of the electrical motor, wherein the at least one outlet is placed on the rotatable external part of the housing and adapted to discharge the cooling medium from the channel by means of centrifugal force during rotation of the rotor, the at least one outlet being an opening that goes through both the rotating external part of the housing and the rotor and is in fluid communication with the channel.

2. The electrical motor according to claim 1, wherein the at least one outlet is evacuating said cooling medium by means of centrifugal force generated during a rotation of the rotor.

3. The electrical motor according to claim 1, wherein said intrinsic cooling system is further comprising an additional channel axially extended through a centre of the stationary internal part of said housing and arranged to allow a cooling medium to flow through.

4. The electrical motor according to claim 1, wherein some of the outlets are aligned around a circumference of said rotating external part of said housing.

5. The electrical motor according to claim 1, wherein said rotating external part of the housing is at least partially cylindrical.

6. The electrical motor according to claim 1, wherein said at least one outlet is any of a round opening, a slit, star-shaped, square-shaped, a borehole, and a conical opening.

7. The electrical motor according to claim 1, wherein the electric motor is arranged to operate in submersed state and said cooling medium is water.

* * * * *